Oct. 11, 1927. Re. 16,769

P. S. GAURIAT

MOTION PICTURE PROJECTION APPARATUS

Original Filed Feb. 4, 1922 3 Sheets-Sheet 1

Inventor
Pierre Sylvain Gauriat

By his Attorney
Ramsay Hoguet

Oct. 11, 1927. Re. 16,769

P. S. GAURIAT

MOTION PICTURE PROJECTION APPARATUS

Original Filed Feb. 4, 1922 3 Sheets-Sheet 2.

Inventor
Pierre Sylvain Gauriat

By his Attorney
Ramsay Hoguet.

Oct. 11, 1927. P. S. GAURIAT Re. 16,769

MOTION PICTURE PROJECTION APPARATUS

Original Filed Feb. 4, 1922 3 Sheets-Sheet 3

Inventor
Pierre Sylvain Gauriat.
By his Attorney
Ramsay Hoguet

Reissued Oct. 11, 1927. Re. 16,769

UNITED STATES PATENT OFFICE.

PIERRE SYLVAIN GAURIAT, OF PARIS, FRANCE, ASSIGNOR TO PATHE CINEMA, ANCIENS ETABLISSEMENTS PATHE FRERES, OF PARIS, FRANCE.

MOTION-PICTURE-PROJECTION APPARATUS.

Original No. 1,596,012, dated August 17, 1926, Serial No. 534,073, filed February 4, 1922, and in France February 21, 1921. Application for reissue filed April 26, 1927. Serial No. 186,793.

The present invention deals with improvements in motion picture projection apparatus.

The invention contemplates the provision of a means for automatically stopping the movement of the motion picture film in the apparatus. In its broader aspect, the invention comprises a stopping means which is purely mechanical in its nature and a means by which the stoppage of the film is obtained by causing the feeding member to automatically assume an inoperative position out of engagement with the film in which position the feeding member may still continue to operate without communicating any movement to the film. The film itself is preferably utilized to cause the automatic change of the feeding member to inoperative position where it may still continue to operate without causing movement of the film.

In the preferred embodiment of the invention, the film driving mechanism is controlled by the action of a lever or a similar element co-operating with a contact element which is caused to bear upon one edge of the film in such a manner that when the said contact element falls into a notch in the edge of the film the said lever or like element will act upon the film driving element in order to disengage the same from the film and to withdraw it into a position where the said driving mechanism may go on working but without acting upon the film so that the film is maintained stationary and a stationary image is projected upon the screen therefrom.

An advantage arising from my invention resides in the fact that the transfer can be easily made from a motion picture projection to a stationary picture projection such as a title, a fixed object or the like, and vice versa, without being obliged to stop the driving mechanism and consequently obviating all shocks or effects of inertia. On the other hand the film may automatically stop at the end of the projection without any danger of tearing the film away from the storage reel to which the end of the film is preferably secured.

In the accompanying drawings, given by way of example:

Figure 1:
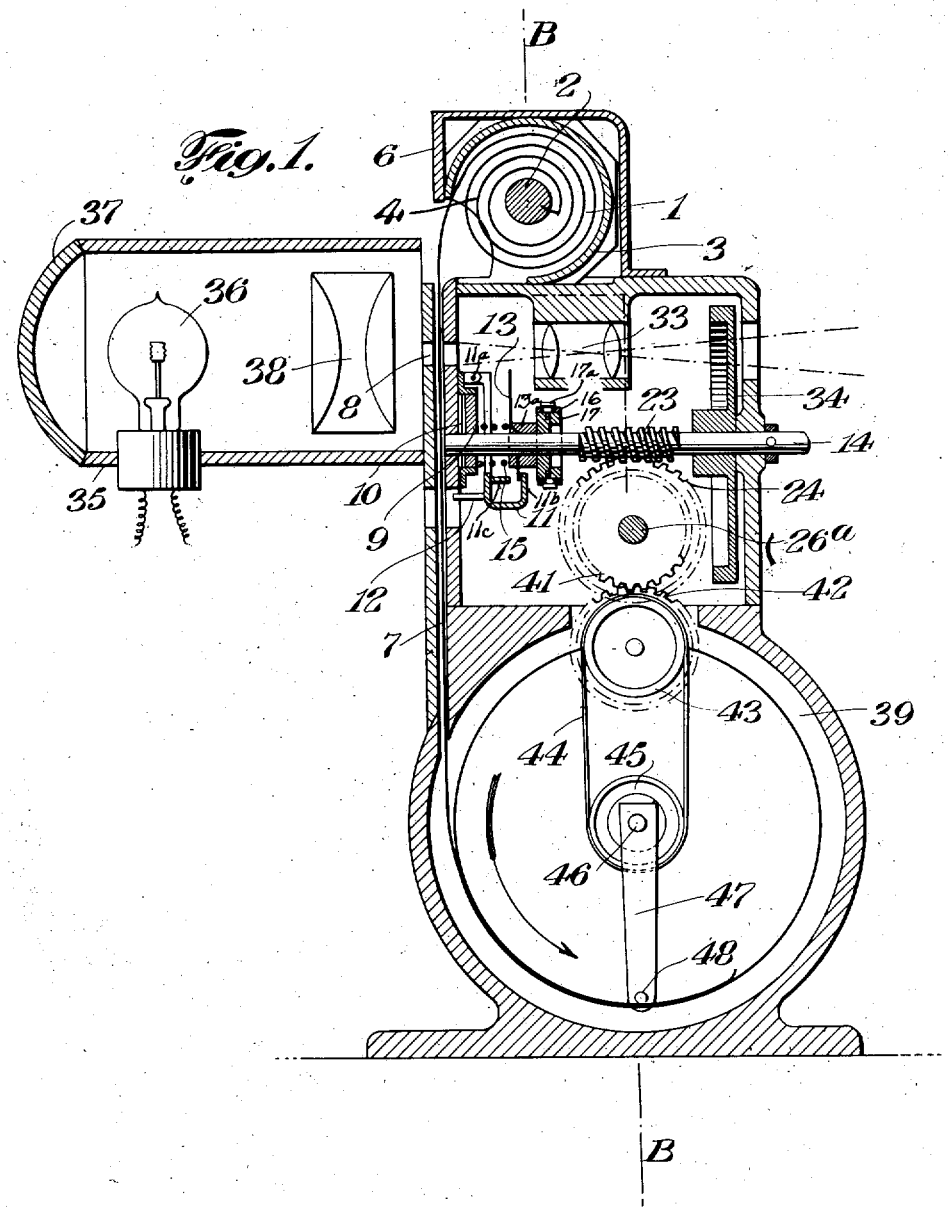
Figure 1 is a vertical elevational section of an apparatus constructed in accordance with the invention, the section being taken on the line A—A of Figure 2.
Figure 2:
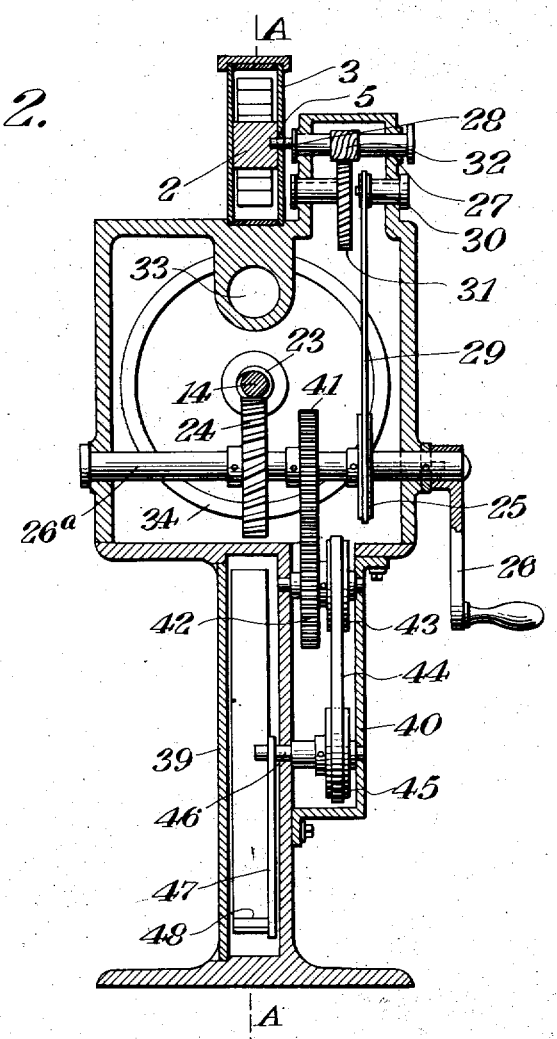
Figure 2 is a cross section on the line B—B of Figure 1.
Figure 3:
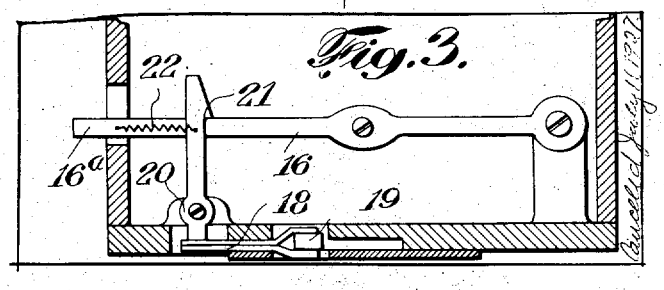
Figure 3:
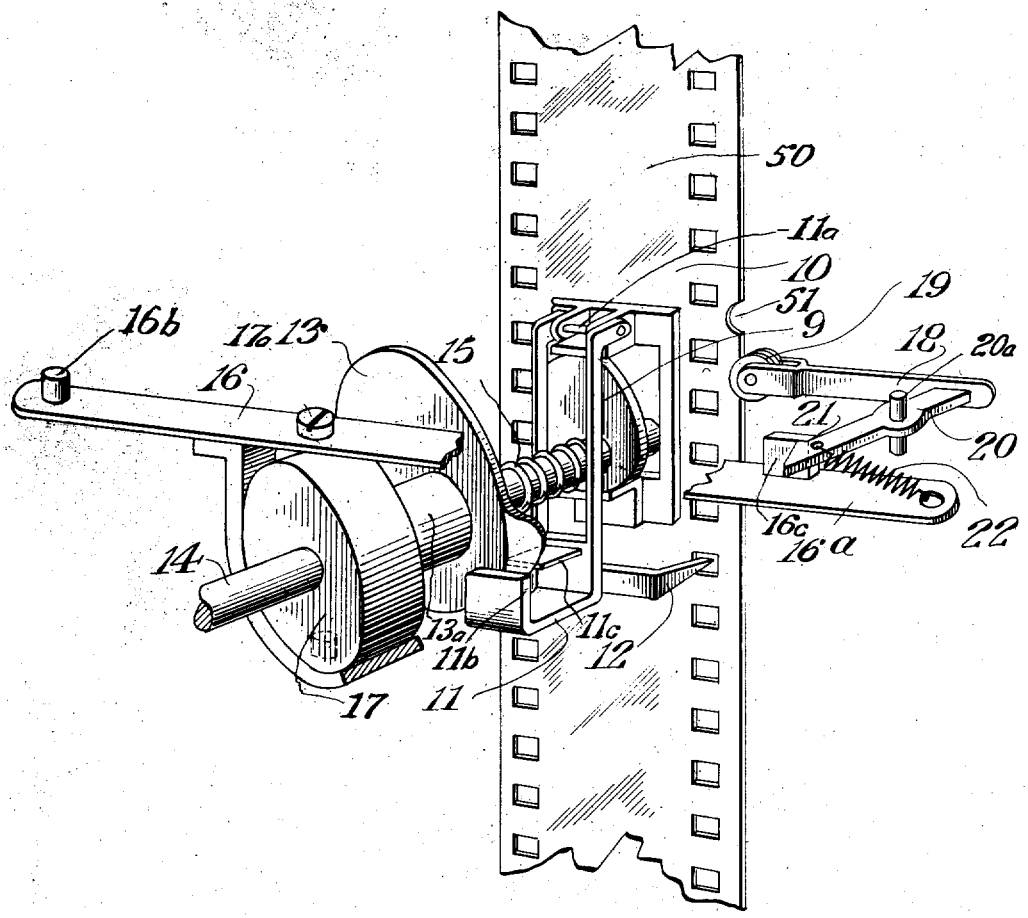

And Figure 3 is a perspective view of the preferred form of stopping mechanism.

Referring now more particularly to the drawings, I have illustrated the invention as embodied in a motion picture projection apparatus which comprises a storage reel, 1, for the film with a revolvable core 2, to which the end of the film is preferably permanently secured. The core is preferably provided at one end with a groove 5 into which is adapted to fit any desired mechanical means for rotating the core. The storage reel is provided with side walls 3 and an aperture 4 through which the film is fed and a support or bracket 6 serves to secure the storage reel to the body of the projection apparatus. The film passing through the storage reel advances through a guideway 7 and a film gate 8 and is wound up in the take up chamber presently to be described at the bottom of the apparatus.

The means for feeding the film through the apparatus preferably comprise feeding claws 12 which are carried on a support 11 which may be pivoted as at $11^a$ to a yoke or frame 10 within which is a cam 9 situated on a shaft 14. As the shaft and cam rotate the frame or yoke 10 is caused to reciprocate vertically by the cam within it. This vertical movement of the yoke causes a corresponding vertical reciprocation of the support 11 and feeding claws 12. On the shaft 14 also there is provided a cam plate 13, one diametric side of which is offset longitudinally with respect to the other. This cam plate is situated between fingers, $11^b$ and $11^c$ associated with the support 11 so that as the cam plate 13 rotates with the shaft 14 it causes a back and forth movement of the support 11 and consequently of the claws 12. Thus, for every revolution of the shaft 14, the claws make a vertical reciprocation and a longitudinal reciprocation and thus intermittently engage the film to cause intermittent passage through the apparatus in a well known manner.

In conjunction with the apparatus above described, and the means for feeding the film through the apparatus, I provide means automatically operated by the film for disengaging the feeding claws 12 from the film and for withdrawing them to a position where they may still continue to work or operate without effecting or causing any movement of the film. This means will best be understood by reference to Figure 3. The cam plate 13 has a bearing 13[a] encircling the shaft 14 and adapted for sliding nonrotatable movement with respect thereto so that the cam plate while caused to rotate with the shaft 14 may move longitudinally with respect thereto. The cam plate and its bearing are normally urged and biased by a spring 15 encircling the shaft 14 to an inoperative position, that is, a position pushed back from the film, and consequently by reason of the operative association of the cam plate with the fingers 11[b] and 11[c] of the support 11, the support 11 and the claws 12 carried thereby are also biased by the spring 15 to an inoperative position where the feeding claws are out of engagement with the film. In order to maintain the cam 13 and consequently the feeding claws in a forward or operative position where the feeding claws may engage the film to cause movement thereof, I provide a mechanism which may take the form of a lever 16 preferably pivoted as at 16[b] to a part of the frame of the projection apparatus. The lever is preferably bifurcated as shown in Figure 3 to provide for the accommodation of a ring 17 loosely encircling the shaft 14 and secured to the lever as by means of set screws 17[a]. The ring 17 abuts against the bearing 13[a] of the cam plate 13 so that when the lever is in its forward position, it serves to maintain the cam plate and consequently the feeding claws in their forward position where the feeding claws may engage the film. The lever is maintained in its forward position by means of a catch 20 or the like which is pivoted as at 20[a] to the frame of the projection apparatus and has a nose 21 which engages a projection 16[c] on the lever 16 to maintain it in its operative position against the action of the spring 15. When it is desired to stop the film, it is only necessary to operate the catch 20 so that the lever 16 may be released.

I provide means operated automatically by the film for disengaging the catch from the lever and consequently stopping the movement of the film through the apparatus. In the form of the invention under consideration, this means includes a sliding member 18 having a roller 19 adapted to contact with the edge of the film. This sliding member as shown in Figure 3 is secured to one arm of the pivoted catch 20, and a spring 22 is utilized for urging the sliding member into a firm contact with the edge of the film. The film 50 is provided with notches 51 on its edge arranged at those places on the film where it is desired to stop the movement of the film through the apparatus either to project a stationary image or for some other purpose.

It will be seen that when the roller strikes one of the notches in the film, it is urged thereinto by the spring 22, consequently the sliding member moves the catch 20 so that the nose 21 is withdrawn from engagement with the lever 16. The cam 13 is thus released by the lever so that it is pushed back by the spring 15 to thereby withdraw the feeding claws from engagement with the film and to move them to a position where they may still continue to operate without effecting the operation of the film. In order to resume the projection the operator may push by hand the lever 16 at the free end 16[a] thereof preferably projecting from the side of the apparatus whereupon the nose 21 of the catch 20 will again engage the projection 16[c] of the lever 16 and the feeding claws are brought back into operative film engaging position. The film is thus restarted and as soon as the roller 19 leaves the notch in the film the lever 16 may be released by the operator and the projection of the film will go on continuously until another notch is reached in the film when the movement of the film is again automatically stopped.

While the rest of the apparatus forms no part of the present invention and no claim is here addressed thereto, I will now go on to describe the same in order that it may be understood and the application of the invention with respect thereto appreciated.

23 is a driving worm mounted on the shaft 14 and in engagement with the worm wheel 24. 25 is a pulley mounted on the shaft of the actuating crank 26. 39 is a flat circular casing wherein the film is caused to enter directly after passing through the guide 7, the film moving before the aperture 8 and being engaged by the feeding claws. The mechanism for rewinding the film is constituted by the shaft 27 having disposed at the end thereof the screwdriver member 28 adapted to engage the groove 5 of the core 2 forming part of the storage reel 1. The said shaft is actuated by the movement of the hand crank by means of the pulley 25, the belt 29, the pulley 30, the worm wheel 31 and the worm 32.

The teeth of the wheel 31 and the worm 32 are situated in the oblique direction in such manner that the shaft 27, which has a sufficient play at the journals, is withdrawn from the storage reel when the crank is turned in the direction corresponding to the projection, but will engage the said core upon rotating the crank in the contrary direction.

The apparatus is completed by the objective 33, a combined fly wheel and shutter 34, and an optical arrangement for projection purposes comprising the lantern 35, the lamp 36, mirror 37 and condenser 38.

In the form of construction shown in the drawing, the apparatus is further completed by a winding device disposed as follows. The driving shaft 26ª has mounted thereon a gear wheel 41 engaging a gear wheel 42 mounted in a casing 40 which is secured to the casing 39. The gear wheel 42 has secured thereto the pulley 43 which is connected by a belt 44 with a second pulley 45 whose shaft 46 extends within the casing 39 at the centre of the same. To the shaft 46 is secured a radial arm 47 having at the end thereof a small pin 48 disposed parallel to the shaft.

Upon turning the crank 26 for the projection of the views, the film will move downwardly under the action of the claws 12 while at the same time the arm 47 is given a movement of rotation within the casing 39. The pin 48 is thus brought in contact with the film and acts upon the latter by friction in the direction of the winding, thereby facilitating the formation of the spiral turns.

To facilitate the winding, it is advantageous to previously give a slightly curved shape to the film in such manner that the end of the film will itself take a suitable position for the engagement with the pin 48.

One method for obtaining this deformation of the film consists in placing the reels of film in a drying room at a temperature of about 50° centigrade. Films thus prepared will roll up in a very satisfactory manner in coils having regular turns.

By the use of the described device, a considerably greater length of film can be stored in the casing 39 than if the said device were not employed.

It will be observed that there is still obtained with the said device the important advantage arising from the facility with which the film may be disposed in the operating position without being obliged to secure the forward end of said film to a winding reel as in the major part of the known devices.

The operation of the apparatus is as follows: Upon turning the crank 26, the shaft 14 is rotated by means of the worm 23. The cam 9 imparts vertical motion to the claw support 11, and the claws 12 engaging the perforations of the film will cause the latter to move downwards. The cam 13 when rotating causes the support 11 to pivot on the frame 10, and thus withdraws the claws 12 at stated intervals to release the same from the film, thus causing the claws to move upwardly in the disengaged position. Should it be desired to temporarily obtain a fixed projection, such for instance as the projection of a title, the roller 19, Fig. 3, will fall into a notch provided at a suitable place in the edge of the film; the lever 20 will thus be drawn by the spring 22, the nose 21 of the same will disengage the lever 16, and the cam 13 may thus recede under the action of the spring 15, thereby maintaining the claws 12 constantly out of engagement with the film. The latter will thus be held stationary while at the same time the whole mechanism of the apparatus is still operating in a continuous manner, thus affording the advantage of obviating all shocks when changing over from the motion to the fixed projection or the contrary. The motion picture projection is recommenced by operating the lever 16 by hand.

When near the end of the projection, the roller 19 will fall into another notch in the film which is formed in the edge toward the end of the same, and in this manner the film is stopped, as in the case of the fixed projection shortly before it has become entirely unwound, thus preventing all tearing of the film from the core 2 of the storage reel.

Having now described my invention, what I claim as new and desire to secure by Letters Patent is:—

1. A motion picture apparatus comprising a feeding member adapted to impart to a film a feeding movement through the machine, means for operating the feeding member, a lever pivoted to the apparatus and operatively associated with the feeding member so as to be capable of moving the feeding member into and out of the film path, a spring urging said lever away from the film, a spring controlled pawl adapted to retain the lever against the action of said spring, a contact member adapted to engage the film and operatively connected to said pawl, and means on the film for causing actuation of the contact member whereby the feeding member is moved out of engagement with the film by the spring and the film is automatically stopped while the feeding member may continue to operate.

2. In a motion picture apparatus, the combination of a film feeding member of the type comprising a claw adapted to engage and disengage the film perforations, with a control shaft for the film feeding member, a sleeve mounted on said shaft so as to be rotated by and to slide along the same, a cam secured to said sleeve and adapted to oscillate said feeding member to and from the film, a lever pivoted to the apparatus body and connected to said sleeve so as to be capable of moving the same along the shaft and thereby move the feeding member into and out of the film path, a spring urging said sleeve and lever away from the film, a spring-controlled pawl adapted to retain the lever against the action of said spring, a contact member adapted to engage the edge of the film and operatively connected to said pawl, and means on the film for causing actuation of the contact member to release the lever.

3. A motion picture apparatus comprising a feeding member adapted to assume an operative position and an inoperative position, means for causing the feeding member to assume its operative position in which a film is fed through the machine when the feeding member is operating, means automatically operated by the film for causing the feeding member to assume its inoperative position in which the feeding member may continue to operate without acting on the film, and means associated with the film for operating said means last-named.

4. A motion picture apparatus comprising a continuously reciprocated feeding member adapted upon engagement with a film to impart an intermittent movement thereto, means for maintaining said feeding member in a film engaging position, means operated by the film for causing the feeding member to assume a position out of engagement with the film whereby the film is stopped while the feeding member may continue to reciprocate, and means associated with the film for operating said means last-named.

5. A motion picture apparatus comprising a feeding member adapted to assume an operative position and an inoperative position, means for biasing the feeding member to its inoperative position where the feeding member may operate without causing movement of the film, means for holding the feeding member in its operative position in which the film is fed through the machine, and means associated with the film for operating said holding means to cause the feeding member to be moved by the biasing means to inoperative position.

6. A motion picture apparatus comprising a feeding member adapted to assume an operative position and an inoperative position, a member in engagement with the film for maintaining the feeding member in operative position in which the film is fed through the machine, and means associated with the film for operating the contact member so that the film is caused to assume its inoperative position where it may operate without causing movement of the film.

In testimony whereof, I have signed my name to this specification this 31 day of March, 1927.

PIERRE SYLVAIN GAURIAT.